Dec. 18, 1934.　　　G. D. RATLIFF　　　1,984,761
WRAPPING MACHINE
Original Filed Aug. 6, 1925　　5 Sheets-Sheet 1

Inventor
George D. Ratliff.
By
Attorney

Dec. 18, 1934.     G. D. RATLIFF     1,984,761
WRAPPING MACHINE
Original Filed Aug. 6, 1925    5 Sheets-Sheet 2
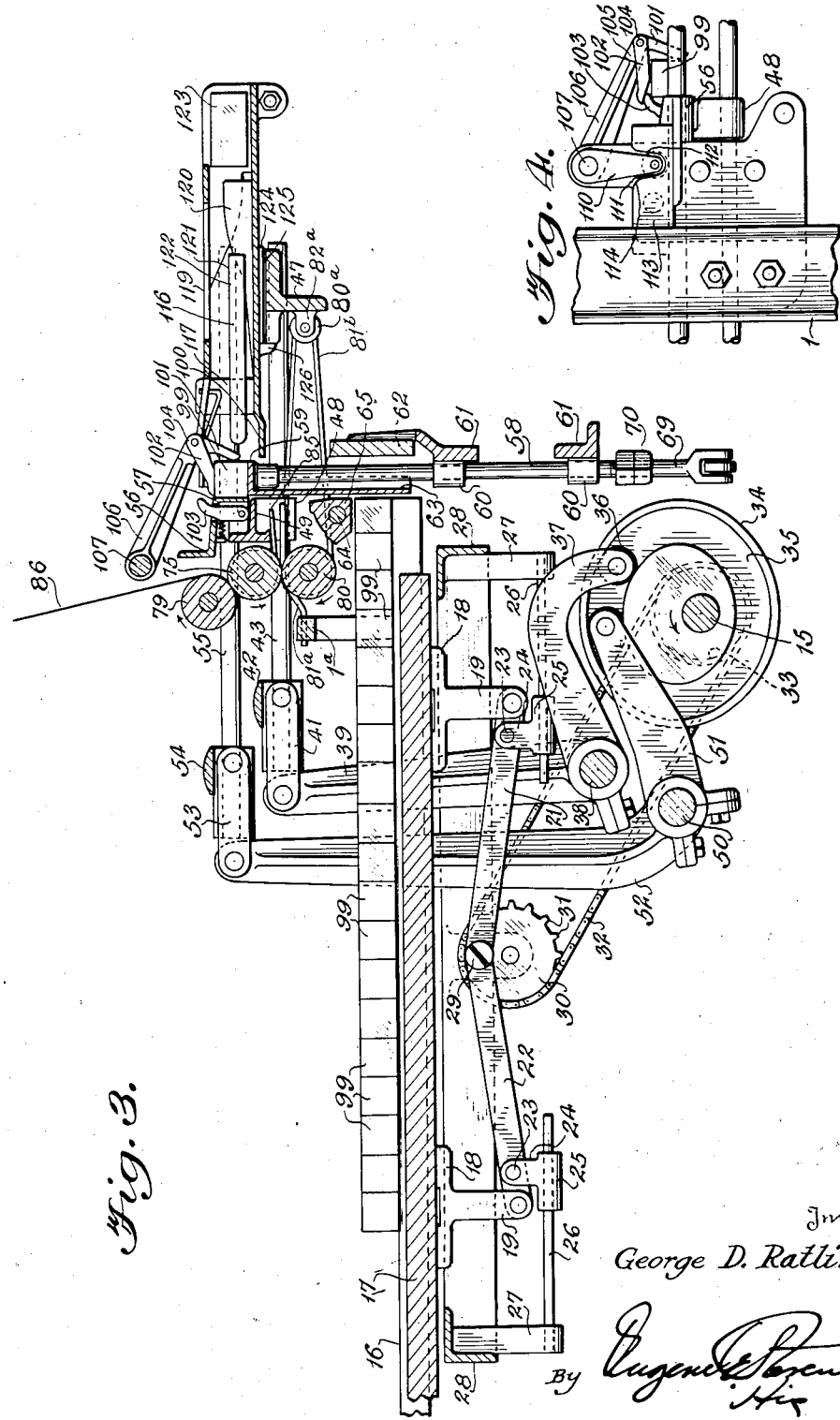
Inventor
George D. Ratliff.
By Eugene Pereue
His Attorney Dec. 18, 1934.  G. D. RATLIFF  1,984,761
WRAPPING MACHINE
Original Filed Aug. 6, 1925   5 Sheets-Sheet 3

Inventor
George D. Ratliff.
By Eugene E. Stevens
His Attorney

Dec. 18, 1934.     G. D. RATLIFF     1,984,761
WRAPPING MACHINE
Original Filed Aug. 6, 1925     5 Sheets-Sheet 4

Inventor
George D. Ratliff.
By
His Attorney

Dec. 18, 1934. G. D. RATLIFF 1,984,761
WRAPPING MACHINE
Original Filed Aug. 6, 1925  5 Sheets-Sheet 5

Inventor
George D. Ratliff.

By Eugene E. Stevens
His Attorney

Patented Dec. 18, 1934

1,984,761

UNITED STATES PATENT OFFICE 1,984,761

WRAPPING MACHINE

George D. Ratliff, Clinton, Miss., assignor to Pioneer Butter Wrapping Machine Company, Jackson, Miss., a corporation of Mississippi Original application August 6, 1925, Serial No. 48,533. Divided and this application April 7, 1931, Serial No. 528,425

4 Claims. (Cl. 93—2)

This invention is a division from my application Serial No. 48,533, filed August 6, 1925, which matured into Patent No. 1,753,868 on April 8, 1930, and relates generally to wrapping machines, although more particularly to a certain new and useful improvement in machines for wrapping articles and packages of various sizes, such, for instance, as loaves of bread, cereal food cartons, and bricks or cubes of butter, cheese, and confections.

My invention has for its chief objects the provision of a machine of the kind and type stated which is relatively simple and compact in form and structure, which is automatic in its operations, and which is efficient in the performance of its intended functions, and the improvement and simplification generally of the machine the subject-matter of United States Letters Patent No. 1,522,545, issued to me under date of January 13, 1925.

And with the above and other objects in view, my invention resides in the novel features of form, construction, arrangement, and combination of parts hereinafter described and pointed out in the claims.

In the accompanying drawings,

Figure 1 is a perspective view, looking toward the discharge or delivery end and the driving-side, of a wrapping-machine embodying my invention;

Figure 2 is an enlarged detail view, in cross section, of the paper-feeding and scoring rolls;

Figure 3 is an enlarged longitudinal section of the machine, through the reciprocatory conveyor or feeder member of the table and the cooperating elevator and the paper-feeding and wrapping mechanism;

Figure 4 is a detail view of the spring-controlled gripping elements of the wrapping mechanism;

Figure 5:
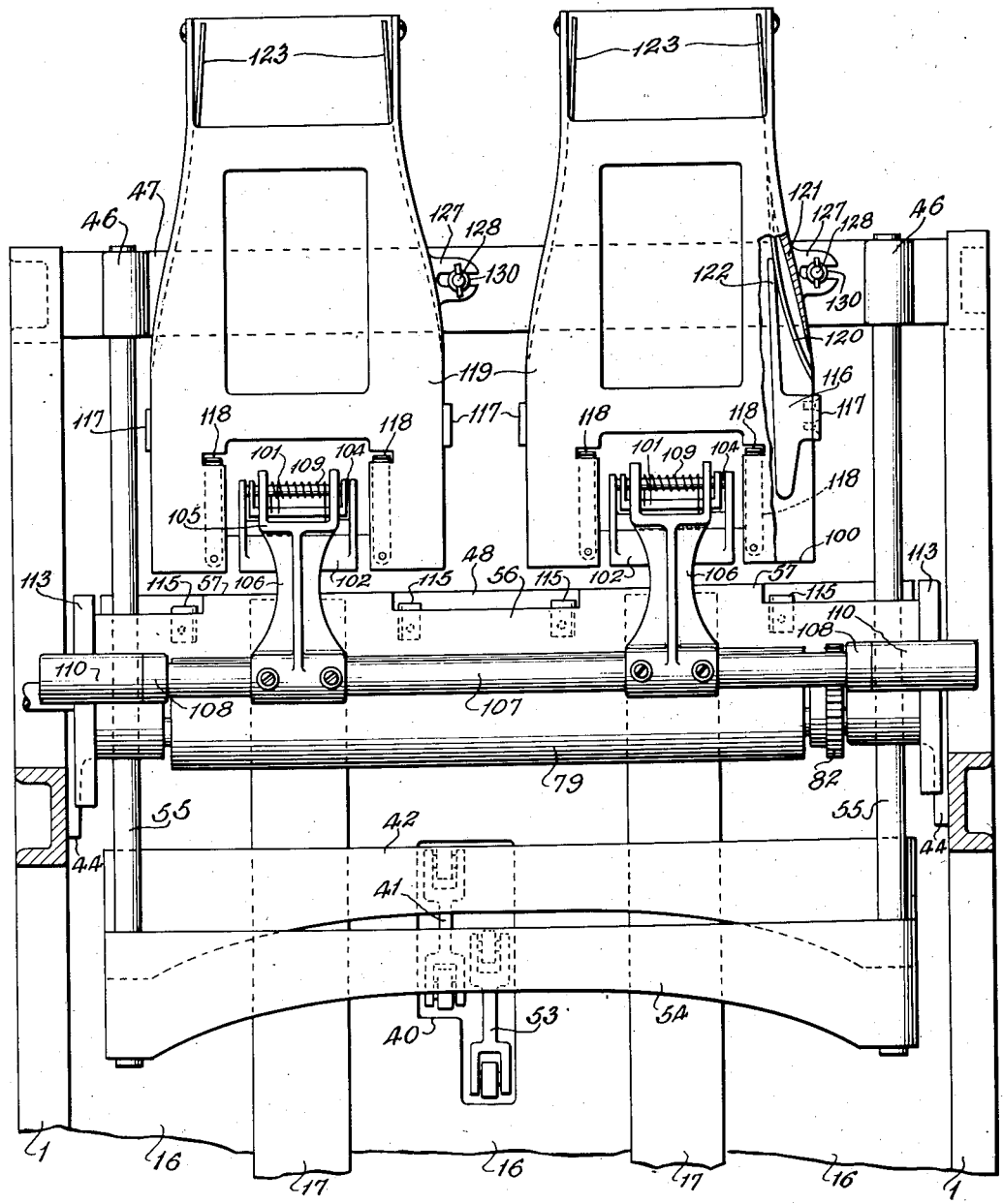
Figure 5 is an enlarged plan view of the paper-feeding and scoring rolls and of the wrapping and folding mechanism.

Referring now more in detail and by reference characters to the drawings, which illustrate a preferred and practical embodiment of my invention, 1 designates generally the frame or stand of the machine. Resting on cross-bars 2 of frame 1, is a support 3 for a suitable motor 4 having an armature-pulley 5 belted to a pulley 6 normally loose on, but adapted by means of a suitable clutch device 8, to be controlled at the will of the operator by a vertically disposed rotary bar or shaft 9 having an operating handle 10, for engagement with, a stub-shaft 7 journalled, as at 11, in a bearing on a horizontal frame member 12 of the machine. Fixed on shaft 7 is a pinion 13 meshing with a gear 14, in turn, fixed on the main shaft 15 of the machine, whereby the latter is driven from the stub-shaft 7 when the clutch 8 is in engagement with the pulley 6.

On the frame 1 is a table 16 on which the articles or packages to be wrapped are placed in a row and moved intermittently and successively in such relation to an elevator device as will presently appear. This table 16 is slotted lengthwise, and the respective articles to be wrapped are supported on the table in slot straddling disposition. Working in and through the table-slot is a longitudinally reciprocating feeder-element or conveyor 17, which normally is disposed with its upper face below the plane of the upper face of the table proper 16 (see Figure 3). The conveyor 17 is provided on its under side with a pair of spaced brackets 18 having downwardly extending standards 19 hingedly attached at their lower ends as at 20, to links 21, 22, respectively, said links being, in turn, hinged, as at 23, on upwardly presented extensions 24 of slide-members 25 which work on horizontal guide-rods 26 supported by brackets 27 depending from the upper horizontal members 28 of the frame 1 of the machine.

The forward link 21 at its rear end and the rear link 22 at its forward end are co-incidentally pivotally attached, as at 29, to the outer face of a disk 30 having peripheral sprocket-teeth 31. The two links 21 and 22 thus constitute a toggle, and to permit the toggle to break at the joint 29 during the operation of the machine, as will shortly be described, there is provided sufficient looseness or endwise play in the respective hinge joints 20 between the end-portions of said links and the bracket extensions 19, that is to say, there is a slight longitudinal elongation of the apertures in said links 21 and 22 where the pivot-bolts or pins pass therethrough at the joints 20. The sprocket-toothed disk 30, it may be here stated, is operated in the direction indicated by the arrow (see Figure 3) by a chain 32 which passes over a similar sprocket wheel 33 (see also Figure 6) fixed on the main shaft 15.

Fixed on the main shaft 15, is a cam 34, working in the groove 35 of which is a roller 36 supported on an arcuated arm 37 fixed on a shaft 38 of the frame 1 of the machine. A second arm 39 extends upwardly from shaft 38 through a suitable opening 40 in the table 16 and is operatively connected by a link 41 to a cross-head 42, which latter has secured thereto a pair of parallel horizontal guide-rods 43 slidable reciprocatorily both through apertures provided therefor in brackets 44 on frame-uprights 45 and bores also provided therefor in lugs 46 on an end cross-member 47 of the frame (see Figures 3 and 5). Fixed on the guide-rods 43, is a second cross-head 48 having a horizontally disposed flange or lip 49, hereinafter termed the "initial folder".

Mounted on a shaft 50 of the frame 1 (see Figure 3), is an arm 51 provided with a roller likewise working in the slot or groove 35 of the cam 34, and an arm 52 extends upwardly from shaft 50 through the opening 40 in the table 16 and is operatively connected by a link 53 to a cross-head 54, secured to which is a second pair of guide-rods 55, similar to but disposed over or above the guide-rods 43, and working reciprocatorily in the same manner through the brackets 44 and lugs 46.

Fixed on the guide-rods 55, is a second cross-head 56 having a vertically disposed abutment-flange 57 to bear against the article or package being wrapped and move or push it forwardly during the folding operations on the wrapper, as will be later more fully set forth. In this connection, it may be here stated that the parts of the machine are so proportioned that the lower edge of the abutment-flange 57 just clears the "initial folder" 49.

Mounted on a vertically disposed reciprocatory rod or bar 58 slidable through lugs 60 on members 61 of the frame 1, is an elevator-platform 59 (see Figure 3) provided to receive the successive articles or packages to be wrapped as they are fed forwardly from the table 16 by the conveyor 17. Opposite the discharge end of the table 16, is an abutment 62 in co-operative relation to the outer edge of the elevator-plate or platform 59; and depending from the edge of the plate 59 adjacent the end of the table 16, is an elongated flange 63, which serves as an abutment for retaining the articles or packages on the table during the time the platform 59 is raised or elevated.

Extending across the discharge end of the table 16 so as to overlie the foremost article or package, is an abutment 64 which is at an elevation just to clear the upper side of the article or package passing thereunder. The flat major portion of the under face of this abutment 64 corresponds substantially to the width of an article or package, and the inner portion is beveled, as at 65, and overhangs the article or package next adjacent the foremost one, as shown, see Figure 3.

The elevator-bar 58 is reciprocated vertically by a bell-crank which is pivotally mounted, as at 66, on a bracket 67 fixed to the frame 1. One arm 68 of this bell-crank is connected by a link 69 to a cross-bar or yoke 70, to which latter the bar 58 is secured. The opposite arm 71 of the bell-crank carried a roller which works in the circumferential groove 72 of a cam 73 fixed on the main shaft 15.

Figure 6:
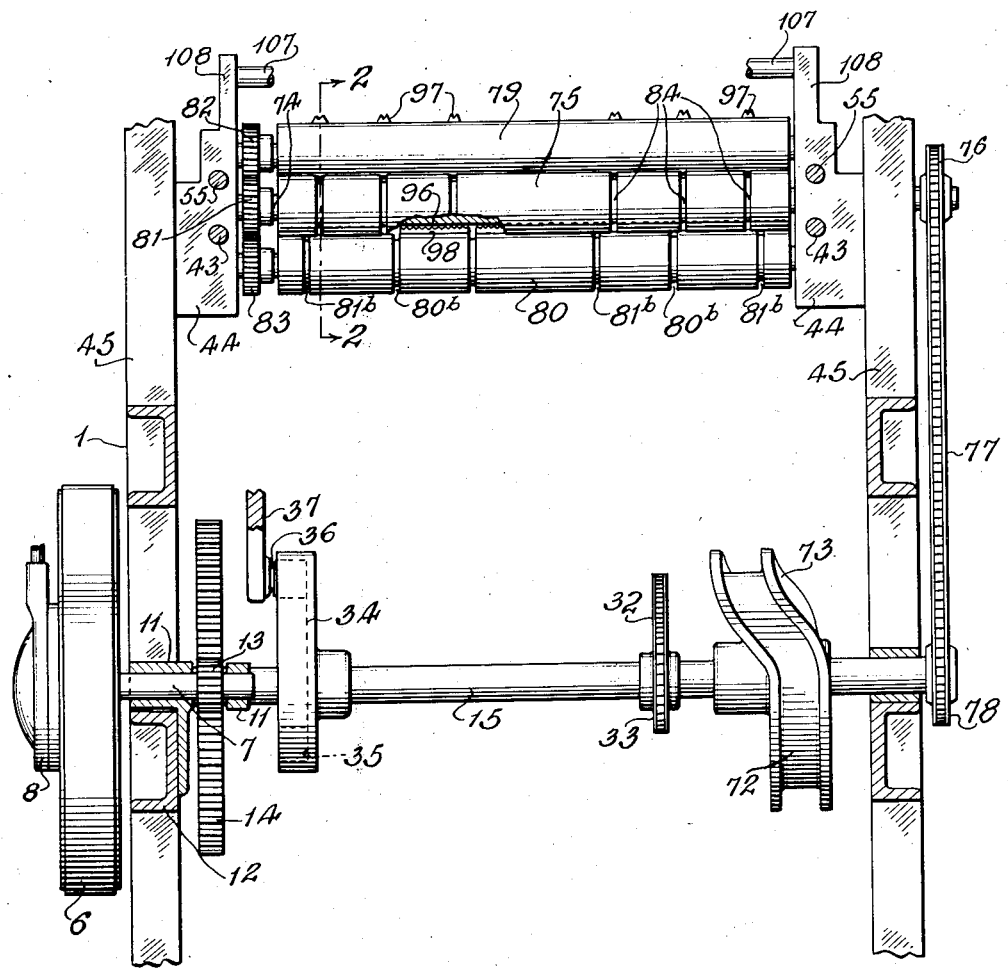
Figure 6 is a detail view showing the various power elements of the machine and, in front elevation, the paper-feeding and scoring rolls.

Fixed on a shaft 74 journalled in the brackets 44, is an intermediate paper-feeding roll 75. As seen in Figure 6, the shaft 74 has a sprocket-wheel 76 on a projecting end, which is driven by a chain 77 passing over a similar sprocket-wheel 78 on the end of the main shaft 15. Co-operating with the roll 75 is an upper roll 79 (see Figures 3 and 6) while below the roll 75 is a third roll 80. The three rolls 75, 79, and 80, are of the same diameter and are rotatable in unison and at the same speed by intermeshing gears 81, 82, and 83, as also best seen in Figure 6.

The wrapping paper or material from the source of supply is brought over the upper roll 79, thence between the roll 79 and the middle roll 75, down over the rear side of the latter, and thence forwardly between the middle roll 75 and the lower roll 80. The paper as it passes between the middle and lower rolls is carried over a set of guide or stripper-fingers 81a projecting forwardly from a supporting transverse frame-member 1a into annular circumferential grooves 80b in the lower roll 80 (see Figures 2, 3 and 6), the paper or other wrapping material then passing on to a suitably spaced series of endless carriers 81b disposed upon the grooved roll 80 and an idler and correspondingly grooved roll or pulley 80a suitably journalled for rotation in frame-brackets 82a whereby the paper or other wrapping material is supported across the path of travel of platform 59 and while the platform is in lowered position. The middle roll 75 also has a series of annular circumferential grooves 84 to accommodate an upper set of guide-fingers 85 which are mounted on the cross-head 48 in a plane just below the "initial folder" flange 49.

The wrapping paper or other material 85 is taken from a supply-roll 87 on a shaft or spindle 88 journalled at its ends on the upper end-portions 89 of uprights 90 (see Figure 1). Co-operating with the supply roll 87 is a brake comprising a flexible strip 91 fastened at one end, its free end being carried over the roll in the direction the paper is unwound and carrying a weight 92.

In practice, the paper or other wrapping material 86 may be taken directly to the feeding rolls from the source of supply, or in the event it is desired to moisten the wrapping material, it may be carried under a guide-rod 93, which latter is immersed in water or some other suitable liquid preparation in a trough 94, thence over a second rod 95 outside the trough (see Figure 1) and then to the feeding rolls.

In the middle paper-feeding roll 75 is a longitudinally disposed surface slot 96, while on the upper roll 79 is a series of serrated or pointed finger-blades 97 which, during each revolution of the two co-operating rolls 75 and 79, which are geared, as stated, to rotate in unison and at the same speed, enter said slot and thereby puncture and sever the paper 86 at intervals transversely thereof.

On the lower roll 80 is a longitudinal series of blades 98 each having a saw-toothed or serrated edge, which blades 98 also enter the slot 96 in the middle roll on each revolution of the co-operating two rolls 75 and 80, so as to coincide with the transverse row of punctures made in the paper 86 and thereby completely sever the strip.

In the operation of the machine, as described up to this point, the articles or packages, for example and for which a machine of this character is well adapted, blocks or bricks of butter or the like 99, are placed on the table 16, side to side and abutting each other in a longitudinal row, and straddling said slot in the table through which the feeder-element of conveyor 17 works, the parts of the machine being at this time substantially in the positions shown in Figure 3.

The row of articles 99 on the table 16 is moved forwardly until the first one of the articles or blocks is at the discharge end of the table and abutting the depending retaining-flange 63 of the elevator or platform 59, which latter at this time, is raised or elevated. The operator then throws in the clutch connection between the sub-shaft 7 and pulley 6, which latter normally, in the idling condition of the machine, is running freely under the power of the motor 4. The main shaft 15 having thus been started to rotate, the sprocket-disk 30 is accordingly rotated through the medium of the chain drive 32, 33, from the main shaft 15, and as the disk 30 rotates a quarter turn or ninety degrees, the link 21 is drawn therewith to approach a horizontal plane through the axes of the disk and the pivot 23, and the link being fulcrumed, as at 23, to the slide 25, the conveyor 17 is elevated. In other words, the conveyor 17 is moved rearwardly and upwardly with a cycloidal motion; and at the time the link 21 reaches this horizontal position, the upper face of the conveyor 17 is just about flush with the upper face of the table 16, and the forward end of the conveyor 17 is just back of the second article from the forward end of the table, or, in other words, under the third article from the forward end of the table. As the disk 30 continues to rotate, and while the pivot-point 29 is travelling through another angle of ninety degrees, the link 21 is rocked downwardly on its fulcrum 23, thereby further raising the conveyor 17, during which time the conveyor is moving forwardly and upwardly and with a cycloidal movement. During the full movement, from the start up to this stage, one-half of an ellipse with its longitudinal axis in a horizontal plane has been described. While this action is occurring, of course, the link 22 is rocked on its fulcrum 23, thereby correspondingly and substantially to the same degree lifting the conveyor 17 in parallel relation throughout with respect to the table 16, this action of the link 22 being permitted by the provision of the slot-and-pin effect afforded by the lost motion or play provided in the joints 20 as before described.

At this stage, the conveyor 17 is in a position with its upper face above the plane of the upper face of the table 16, and, consequently, the articles 99 to the rear of the first two of the row upon the table are raised by said feeder-element and moved forward the distance substantially the width of an article, and said two foremost articles are, of course, moved ahead with them. While this action is occurring, the elevator-plate 59 has been in lowered position flush with the table 16 and the foremost article of the row on the table has been moved onto said elevator-plate and the second article has been moved up to the forward edge of the table.

From this stage on, the point 29 on the disk 30 is moved a half turn or through an angle of the hundred eighty degrees and back to the original position shown in Figure 3, the upper, forward corner of the conveyor having then completely described an ellipsoidal path. As the disk 30 rotates continuously during the operating of the machine, obviously the articles 99 are thus fed intermittently and successively onto the elevator-plate 59.

The timing of the elevator-plate 59 is arranged so that immediately it receives the article 99 thereon it rises quickly to the position shown in Figure 3, where the article is in a position with its under side just slightly above the upper face of the flange 49 of the cross-head 48 and alongside the abutment flange 57 of the cross-head 56. During this upward travel of the elevator-plate or platform 59, the particular article 99 thereon is pressed against the under side of the portion of the strip of wrapping paper 86, which latter, as before described, has been severed and fed forward on the guide-fingers 81 and under the guide-fingers 85.

Figure 7:
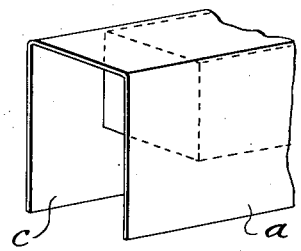
Figures 7 to 13, inclusive, illustrate the progressive stages of the wrapping of an article by the machine.

As the platform 59 continues to rise, the wrapping sheet 86 is carried up on top of the article, and as the article passes the edge of the flange 49 of the cross-head 48 and also the inner edge of the bottom plate 100 of a folding and tucking device to be presently described, the severed sheet section is thereby folded and drawn taut on opposite sides of the article, this stage of the wrapping being clearly illustrated in Figure 7.

As the elevator-platform 59 reaches its highest position, the particular article 99 partially wrapped as just set forth is carried between the abutment face 57 of the cross-head 56 and a spring-pressed element 101, which latter bears against the forward side of the article outside the wrapping section or sheet. As the article is thus elevated, its top side is brought into engagement with a second spring-pressed element 102, adapted for co-operation with a spring-pressed trigger or latch element 103 on the cross-head 56. In this connection, it may be here stated, that the two elements 101 and 102 are hinged about a cross-rod 104 on the bifurcated end portion 105 of an arm 106 fixed on a shaft 107 journalled at its ends in upward extensions 108 of the brackets 44. Coiled about the cross-rod 104 is a spring 109 whose opposite end portions are respectively attached to or bear upon said elements 101 and 102, said spring being so wound and normally set to function to yieldingly swing the two elements toward each other. Such construction has the effect of yieldingly pressing the element 101 against the article, and as the element 102 is raised into engaging relation to the trigger or latch member 103, obviously the force of the spring 109 on the element 101 is thereby increased so that it effectively holds the article against the abutment face 57.

On the end of the shaft 107 is a rock-arm 110 (see Figures 1 and 4), on the end of which latter is a roller 111 that normally rests in a notch 112 in a side-plate 113 on the cross-head 56, said notched portion 112 having its rear side rounded, as at 114, whereby, when the cross-head 56 is moved forwardly, as will be presently described, the roller 111 rides out of the notch 112 and up on the top edge of said side-plate 113, thereby rocking the arm 110 and, of course, rotating the shaft 107 and lifting the arm 106. As the arm 106 rises, the member 101 is drawn upwardly therewith, but remains for quite a while in contact with the side of the article 99 and until the article 99 has traveled some distance onto the bottom plate 100 of the folding and tucking device, at which time the member 101 is withdrawn entirely from engagement with the article 99 and the member 102 has been disengaged from the trigger or latch element 103.

Figure 8:
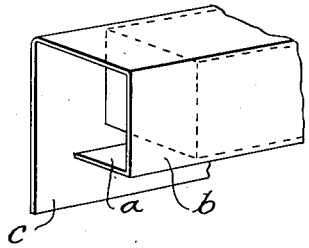
Figure 9:
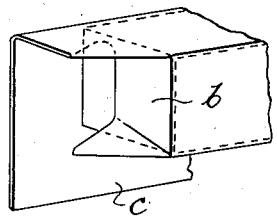

Just after the elevator platform 59 has descended and left the article clamped and held between the member 101 and abutment face 57, the cross-head 48 moves forwardly, during which time the flange 49 rides under the article and folds the flap a of the wrapper-section under the article 99, as shown in Figure 8. On the cross-head 48 is a pair of infolders 115 which are spaced apart a sufficient distance to straddle the article end-wise thereof and terminate some distance behind the forward edge of the flange 49. These infolders 115, following behind the edge portion of the flange 49, tuck in the ends b of the wrapper, as shown in Figure 9.

Figure 10:
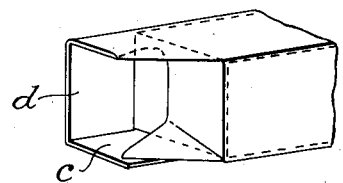

After these wrapping or folding operations have taken place, the cross-head 56 moves forwardly, pushing therewith the article in its partially wrapped stage, and the arm 106 is, of course, swung upwardly as before described. As the particular article 99 is moved over the plate 100, a second flap c of the wrapper is folded under, as shown in Figure 10; and the end portions f of the wrapper (see Fig. 11) are engaged and tucked in by a pair of infolders 116 mounted on brackets 117 on opposite sides of the folding and tucking device and also spaced apart a sufficient distance to straddle the article endwise thereof.

After the article, wrapped to the stage described, has moved well along between the infolders 116 and just about the time the element 101 is lifted from engagement with the article, the article is brought under the pressure of a pair of spring-tongues 118 mounted on a top plate 119 of the folding and tucking device, which spring-tongues yieldably hold the article in slidable contact with the upper face of the plate 100.

The article from this time on is pushed forwardly on the folding and tucking device, between the bottom plate 100 and top plate 119, by the other articles successively following it, and which have been successively conveyed from the table 16 to the elevator-plate 59 and hoisted by the latter to be acted upon by the several agencies or devices just above described in connection with first article 99.

Figure 12:
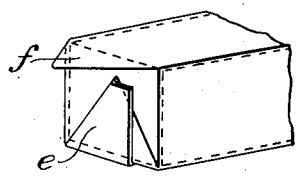
Figure 13:
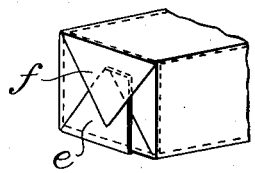

As the article moves toward the discharge end of the folding and tucking device, the lower folded triangular end flaps e and upper flaps f are successively acted upon by pairs of curved tucker-strips 120 and 121, respectively, the strips 120 being arranged to act upon respective flaps of the wrapper just ahead of the strips 121, the curvature of the one pair, of course, being reverse to that of the other pair. The stage of the folds effected by the tucker-strips 120 is shown in Figure 12, while that effected by the tucker-strips 121 is shown in Figure 13.

Figure 11:
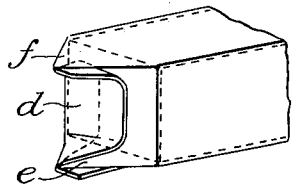

The infolders 116 are extended forwardly, as at 122, so as to partially overlap the tucker-strips 120 and 121 (see Figures 3 and 5). By this arrangement the end folds, in the stage shown in Figure 11, are maintained until the folding of the triangular flaps has been accomplished or at least been partially effected; and, to hold the finally complete wrapping intact, a pair of opposed spring-tongues 123 are provided at the discharge end portion of the folding and tucking device (see Figures 3 and 5), between which the article passes just prior to being borne off the machine, either by hand, or obviously, by some suitable conveyor.

While the machine up to this point has been described in the singular sense, it is to be here noted that the machine, as shown in the drawings is a double structure, or in other words, there are duplicate sets of the respective mechanisms for conveying the articles through the machine and effecting the wrapping operations; and, obviously, a greater multiplicity of the sets may be incorporated in a single machine and operated simultaneously or otherwise from one source of power and under the control of a single attendant. So, too, by obviously providing two or more supply rolls, the same number of wrapping sheets or sections may be overlaid the one upon the other and carried in such multiple or laminated relation between the feed rolls 75, 79, and 80, and thence on the guide-fingers 81, to the article to be accordingly enclosed in such multiple wrapping. It is also preferable to have the folding and tucking devices as a separate unit, including the bottom-plate 100, which latter may be detachably mounted on the cross-member 47 of the frame of the machine. This may be readily accomplished by providing the plate 100 with a lug or rib 124 on its under side to fit in a transverse groove 125 in the upper face of the cross-member 47 (see Figure 3), the outer side of said lug or rib 124 being undercut and the adjacent side of the groove 125 being a counterpart thereof, so as to afford a releasable interlocking engagement therewith. A second lug 126 is also provided on the under side of the plate 100 to engage the inner edge portion of the cross-member 47 so as to resist any movement of the plate 100 forwardly on said cross-member. The plate 100 may be conveniently and releasably locked in place by a bifurcated lug 127 at its side opposite the lug 124, the lug 127 being engaged by a bolt 128 (see Figures 1 and 5) hinged, as at 129, to the cross-member 47 and preferably provided with a spring 130 adapted to engage the upper face of the lug. By this arrangement, the folding and tucking units may be provided in different sizes and be interchangeably mounted in the machine so as to accordingly take care of and accommodate packages of various dimensions. This feature of detachability also facilitates cleaning the device from time to time, as occasion may require.

The machine further admits of considerable modification without in the least departing from the spirit and scope of the invention as defined by the appended claims. It is, therefore, not limited to the specific structure shown in the accompanying drawings. I might here add that the abutment 64 functions to prevent but one article 99 at a time being carried upwardly by the platform 59 to the wrapping mechanism, and the springs or other suitable preferably yielding-members 118 function to hold the partially wrapped article 99 from being drawn rearwardly of the machine in the return or non-feeding reciprocation of the cross-head abutment 57.

Having thus described my invention, what I claim and desire to secure by Letters Patent is:

1. In a wrapping machine, the combination of a conveyor for conveying objects to be wrapped into said machine, an elevator for raising each object to a wrapping mechanism, said mechanism comprising a source of paper supply disposed over said elevator whereby the elevated article is pressed against the underside of said paper, means for severing said paper, means for folding the opposite sides of the paper carried by the article upon the continued rise of the elevator a spring pressed gripper arranged above said elevator for holding the article upon descent of the elevator, a reciprocating cross-head having a horizontally disposed lip arranged adjacent the upper extremity of the paper on the article for folding the underside of the paper on the article, a second reciprocating cross-head disposed above the first mentioned cross-head and having a vertically disposed abutment flange for bearing against the article, the lower edge of said flange clearing the horizontally disposed lip of the first mentioned cross-head, and a latch element carried by the upper cross-head and adapted for cooperation with the spring pressed gripper for holding the article against the vertically disposed abutment flange, and means for releasing said latch element for permitting the article to move forwardly for completion of the wrapping.

2. In a wrapping machine, the combination of a conveyor for conveying objects to be wrapped into said machine, a reciprocating elevator having a platform arranged to lift the articles to a wrapping mechanism, said mechanism comprising a source of paper supply disposed over the elevator and adapted to be engaged by an elevated article, means for folding the sides of the wrapper on the article upon a further rise of the elevator, a spring pressed gripper arranged over the top of said elevator and adapted to engage the article, a reciprocating cross-head having a horizontally disposed lip arranged adjacent the upper extremity of the elevator for folding the underside of the paper on the article, a second reciprocating cross-head disposed above the first mentioned cross-head and having a vertically disposed abutment flange for bearing against the article, the lower edge of said flange clearing the horizontally disposed lip of the first mentioned cross-head, and a latch element carried by the upper cross-head and adapted for cooperation with the spring pressed gripper for holding the article against the vertically disposed abutment flange, means whereby said latch member is released for permitting the forward movement of the article to a completion unit, said unit being separable and comprising side, bottom and top plates, a pair of reversely curved tucker strips carried by the bottom plate and a pair of infolders carried by the sides, said infolders extended forwardly to partially overlap the tucker strips.

3. In a wrapping machine, the combination of a conveyor for conveying objects to be wrapped into said machine, an elevator for raising each object to a wrapping mechanism, said mechanism comprising a source of paper supply disposed over said elevator for contact with an article, means for severing said paper, means for folding the sides of the paper upon a continued rise of the elevator, means for removing and retaining said article from the elevator, means for releasing said article, means for laterally moving the article and the additional folding of the wrapper thereby and a separable unit forwardly arranged for completing the folding and tucking of the wrapper on the article, said unit consisting of side, bottom and top plates and open ends, spring elements carried by the top plate for yieldingly bearing against the article, reversely curved tucker strips carried by the bottom plate, infolders carried by the sides, said infolders extended forwardly to partially overlap the tucker strips, and opposed spring tongues arranged at one end of said unit for holding the completed wrapping intact.

4. In a wrapping machine, the combination of a conveyor for conveying objects to be wrapped into said machine, an elevator for raising each object to a wrapping mechanism, said mechanism comprising a source of paper supply disposed over said elevator whereby the elevated article is pressed against the underside of said paper, cooperating rolls for severing said paper, one of said rolls having grooves therein, means whereby the opposite sides of the paper are folded upon the article when raised by the elevator, a spring pressed gripper arranged above said elevator for folding the article upon descent of the elevator, a reciprocating cross-head having a horizontally disposed lip arranged adjacent the upper extremity of the elevator for folding the underside of the paper on the article, a set of guide fingers carried by said cross-head in a plane below the horizontal lip and associating with the grooves in said roll, a second reciprocating cross-head disposed above the first mentioned cross-head and having a vertically disposed abutment flange for bearing against the article, the lower edge of said flange clearing the horizontally disposed lip of the first mentioned cross-head, and a latch element carried by the upper cross-head and adapted for cooperation with the spring pressed gripper for holding the article against the vertically disposed abutment flange, and means for releasing said latch element for permitting the article to move forwardly for completion of the wrapping.

GEORGE D. RATLIFF.